(12) United States Patent
Yano et al.

(10) Patent No.: US 8,790,219 B2
(45) Date of Patent: Jul. 29, 2014

(54) EXHAUST EMISSION PURIFYING APPARATUS FOR ENGINE

(75) Inventors: Masakazu Yano, Ageo (JP); Kiminobu Hirata, Ageo (JP); Nobuhiko Masaki, Ageo (JP)

(73) Assignee: UD Trucks Corporation, Ageo-shi (JP)

( * ) Notice: Subject to any disclaimer, the term of this patent is extended or adjusted under 35 U.S.C. 154(b) by 460 days.

(21) Appl. No.: 13/162,725

(22) Filed: Jun. 17, 2011

(65) Prior Publication Data

US 2011/0239632 A1     Oct. 6, 2011

Related U.S. Application Data

(63) Continuation of application No. PCT/JP2009/067255, filed on Oct. 2, 2009.

(30) Foreign Application Priority Data

Dec. 19, 2008 (JP) ................................ 2008-323148

(51) Int. Cl.
*F16H 59/74* (2006.01)

(52) U.S. Cl.
USPC ........................................................ 477/100

(58) Field of Classification Search
USPC .................. 477/100, 34, 111; 475/251, 248; 60/295, 282, 272, 286, 297
See application file for complete search history.

(56) References Cited

U.S. PATENT DOCUMENTS

| | | | |
|---|---|---|---|
| 7,422,544 B2 * | 9/2008 | Berglund et al. | 477/100 |
| 7,435,201 B2 * | 10/2008 | Steen et al. | 477/98 |
| 8,341,942 B2 | 1/2013 | Brück et al. | |
| 2002/0165063 A1 * | 11/2002 | Ito | 477/37 |
| 2003/0216855 A1 | 11/2003 | Liang et al. | |
| 2005/0066652 A1 | 3/2005 | Ketcher et al. | |

(Continued)

FOREIGN PATENT DOCUMENTS

| | | |
|---|---|---|
| CN | 1798935 A | 7/2006 |
| JP | 7-166850 A | 6/1995 |

(Continued)

OTHER PUBLICATIONS

Chinese Office Action and English Language Translation dated May 15, 2013 (13 pages).

(Continued)

*Primary Examiner* — David D Le
*Assistant Examiner* — David J Hlavka
(74) *Attorney, Agent, or Firm* — Foley & Lardner LLP (57) ABSTRACT

In order to maintain a high NOx purification rate of a NOx reduction catalytic converter even in the case in which an NOx emission amount from an engine changes suddenly, in an exhaust emission purifying apparatus for an engine that reduces and purifies NOx in exhaust gas using ammonia generated from an injection-supplied urea aqueous solution, after engine starting, when an exhaust temperature exceeds a predetermined temperature T (step S1), an amount of urea aqueous solution corresponding to an actual engine operating state is injection-supplied (steps S3 to S5). On the other hand, at a change of the transmission speed ratio based on a driver's shift operation, an engine operating state after the change of the transmission speed ratio is predicted (steps S2, S6), and an amount of urea aqueous solution corresponding to the predicted engine operating state is injection-supplied before the change of the transmission speed ratio is completed (steps S7, S8).

3 Claims, 5 Drawing Sheets

(56) References Cited

U.S. PATENT DOCUMENTS

| | | |
|---|---|---|
| 2006/0277898 A1 | 12/2006 | McCarthy |
| 2007/0042495 A1* | 2/2007 | Pavlova-MacKinnon et al. ............................. 436/55 |
| 2007/0079605 A1 | 4/2007 | Hu et al. |
| 2007/0082783 A1* | 4/2007 | Hu et al. ....................... 477/100 |
| 2010/0037598 A1 | 2/2010 | Brück et al. |
| 2011/0154808 A1* | 6/2011 | Hirata et al. ................... 60/297 |

FOREIGN PATENT DOCUMENTS

| | | |
|---|---|---|
| JP | 10-338059 A | 12/1998 |
| JP | 11-229850 A | 8/1999 |
| JP | 2000-027627 A | 1/2000 |
| JP | 2000-27988 A | 1/2000 |
| JP | 2000-110601 A | 4/2000 |
| JP | 2007-177763 A | 7/2007 |
| JP | 2007-303437 A | 11/2007 |
| WO | WO 03/031030 A2 | 4/2003 |
| WO | WO 2008/135535 A1 | 11/2008 |
| WO | WO 2009/074860 A2 | 6/2009 |

OTHER PUBLICATIONS

Chinese Office Action and English Language Translation dated Oct. 24, 2013 (10 pages).

Japanese Office Action and English Language Translation dated Sep. 10, 2013 (6 pages).

Chinese Office Action and English Language Translation dated Apr. 8, 2014 (7 pgs.).

* cited by examiner

| UREA AQUEOUS INJECTION AMOUNT [g/h] | TORQUE [Nm] | | | | | |
|---|---|---|---|---|---|---|
| | 0 | 300 | 600 | 900 | 1200 | 1500 |
| ENGINE SPEED [rpm] 500 | 0 | 100 | 100 | 100 | 100 | 100 |
| 750 | 0 | 200 | 300 | 350 | 400 | 500 |
| 1000 | 0 | 300 | 500 | 700 | 900 | 1000 |
| 1250 | 0 | 500 | 750 | 1000 | 1500 | 2000 |
| 1500 | 0 | 700 | 1000 | 1500 | 2000 | 3000 |
| 1750 | 0 | 1200 | 1500 | 2000 | 3000 | 4000 |
| 2000 | 0 | 1500 | 2000 | 3000 | 4000 | 5000 |
| 2250 | 0 | 2000 | 3000 | 4000 | 5000 | 6000 |

EXHAUST EMISSION PURIFYING APPARATUS FOR ENGINE

This application is a continuation of PCT/JP2009/067255, filed on Oct. 2, 2009.

BACKGROUND OF THE INVENTION

1. Field of the Invention

The present invention relates to an exhaust emission purifying apparatus for an engine that reduces and purifies nitrogen oxides (NOx) in exhaust gas using a reducing agent.

2. Description of Related Art

As an exhaust emission purifying apparatus that purifies NOx contained in exhaust gas from an engine, an exhaust emission purifying apparatus using ammonia as a reducing agent was known. For example, an exhaust emission purifying apparatus disclosed in Japanese Patent Application Publication No. 2000-27627 injection-supplies a urea aqueous solution to an upstream side of a NOx reduction catalytic converter positioned in an exhaust passage, to reduce and purify NOx in exhaust gas by ammonia that is generated from the urea aqueous solution.

However, since the conventional exhaust emission purifying apparatus mentioned above injection-supplies the urea aqueous solution when an increase in NOx concentration in the exhaust gas is detected, there was a possibility that, for example in the case in which an engine operating state changes suddenly by a driver's shift operation or the like and an NOx amount emitted from the engine increases, a control delay occurs and a sufficient amount of urea aqueous solution may not be injection-supplied, resulting in a decrease in NOx purification rate.

SUMMARY OF THE INVENTION

In view of such a problem, the present invention has an object to provide an engine exhaust emission purifying apparatus that can maintain a high NOx purification rate even in the case in which a NOx emission amount from an engine changes suddenly.

According to one aspect of the present invention, an engine exhaust emission purifying apparatus includes: a reduction catalytic converter that is disposed in an exhaust pipe of an engine connected to a transmission, and that reduces and purifies nitrogen oxides in exhaust gas using a reducing agent; a injection-supply device that injection-supplies the reducing agent or a precursor thereof, to an exhaust upstream side of the reduction catalytic converter; and a control device that, at a change of a speed ratio of the transmission based on a driver's operation, controls the injection-supply device, based on an engine operating state after the change of the speed ratio of the transmission.

According to the above-mentioned exhaust emission purifying apparatus, before the engine operating state changes due to the change of the transmission speed ratio, the reducing agent or its precursor can be injection-supplied in the amount corresponding to the changed engine operating state (i.e., the engine operating state after the change of the transmission speed ratio). Hence, even in the case in which the NOx emission amount increases due to the change of the engine operating state, a high NOx purification rate in the reduction catalytic converter can be maintained. In addition, in the case in which the NOx emission amount decreases, excessive injection-supply of the reducing agent or its precursor is prevented, so that a high utilization rate of the reducing agent or its precursor can be maintained.

DETAILED DESCRIPTION OF THE PREFERRED EMBODIMENTS

The following describes an embodiment of the present invention with reference to the accompanying drawings.

Figure 1:
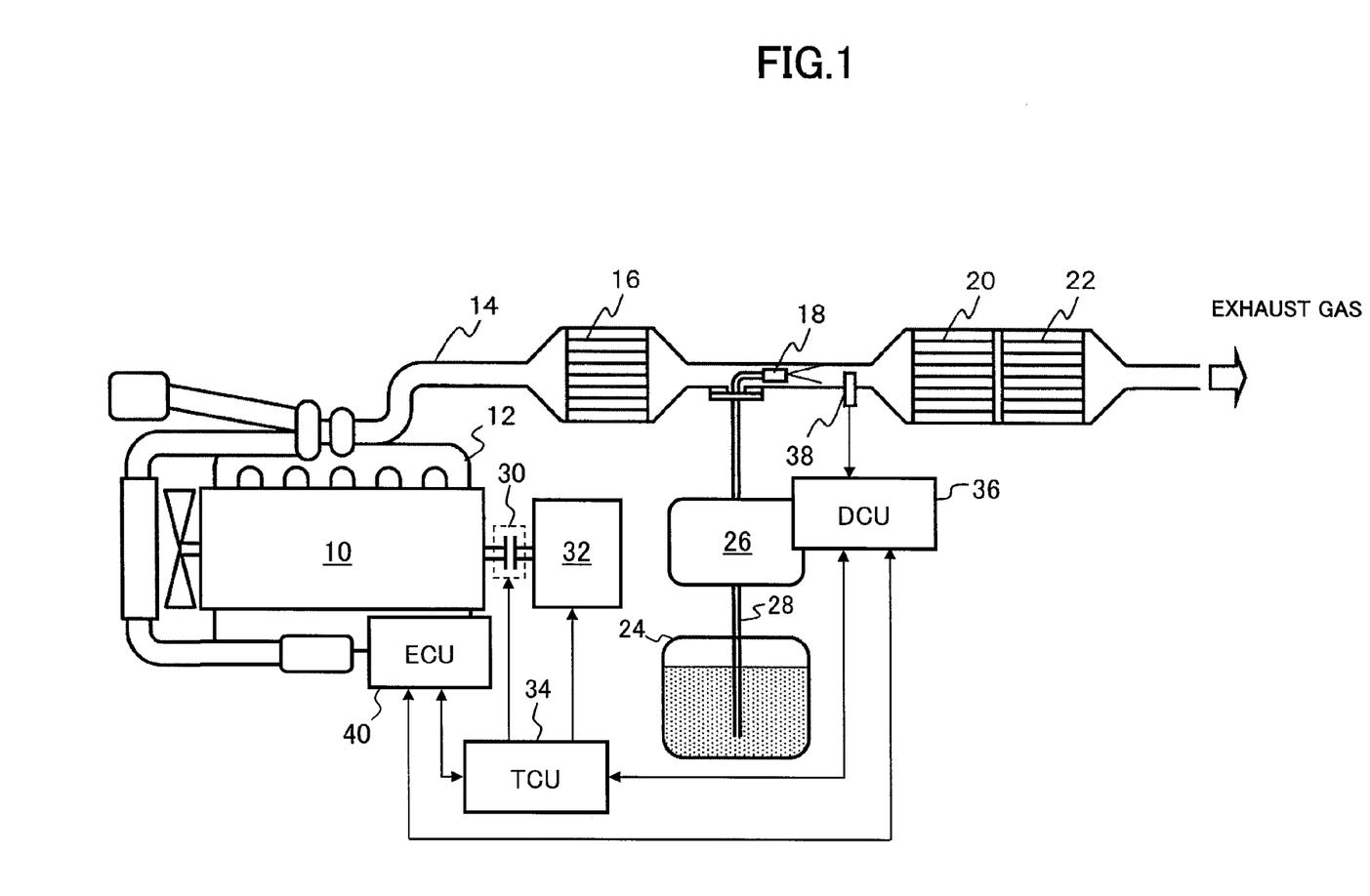
FIG. 1 is a view illustrating an overall structure of an exhaust emission purifying apparatus according to an embodiment of the present invention.

FIG. 1 illustrates an overall structure of an exhaust emission purifying apparatus for an engine according to an embodiment of the present invention. The exhaust emission purifying apparatus according to this embodiment injection-supplies a urea aqueous solution (a precursor of a reducing agent), to reduce and purify nitrogen oxides (NOx) in exhaust gas by a catalytic reduction reaction using ammonia (the reducing agent) obtained from the urea aqueous solution.

In FIG. 1, an exhaust pipe 14 is connected to an exhaust manifold 12 of an engine 10. In this exhaust pipe 14, a nitrogen oxidation catalytic converter 16 that oxidizes nitric oxide (NO) in the exhaust gas to convert it to nitrogen dioxide ($NO_2$), an injection nozzle 18 that injection-supplies the urea aqueous solution into the exhaust pipe 14, an NOx reduction catalytic converter 20 that reduces and purifies NOx using ammonia generated from the urea aqueous solution by hydrolysis, and an ammonia oxidation catalytic converter 22 that oxidizes ammonia having passed through the NOx reduction catalytic converter 20 are arranged in this order from an exhaust upstream side. The urea aqueous solution is stored in a urea water tank 24, and supplied to the injection nozzle 18 via a supply pipe 28 by a urea water dosing device 26 that includes a pump and a flow control valve. Note that the injection nozzle 18, the urea water tank 24, the supply pipe 28, and the urea water dosing device 26 constitute an "injection-supply device" in the present invention.

An output shaft of the engine 10 is connected to a transmission 32 via a clutch mechanism 30, and rotation of the engine 10 is changed in speed by the transmission 32 and transferred to a drive wheel (not illustrated). For example, the transmission 32 has speed ratios (gear ratios) corresponding to first-speed through fifth-speed, respectively, and changes the speed ratio (gear ratio) according to a vehicle running state or a driver's request. That is, the transmission 32 operates in an automatic transmission mode of automatically changing the speed ratio of the transmission 32 (transmission speed ratio) according to the vehicle running state and a manual transmission mode of changing the speed ratio of the transmission 32 based on the driver's shift operation. The clutch mechanism 30 and the transmission 32 are controlled by a transmission control unit (hereafter referred to as "TCU") 34. When changing the speed ratio of the transmission 32, the TCU 34 first releases the clutch mechanism 30 to block power transmission from the engine 10 to the transmission 32. The change operation of the speed ratio of the transmission 32 is performed in this state, and then the TCU 34 engages the clutch mechanism 30 to complete the change of the transmission speed ratio.

The injection-supply of the urea aqueous solution from the injection nozzle 18 is controlled by a urea water dosing control unit (hereafter referred to as "DCU (Dosing Control Unit)") 36. Output signals of various sensors such as a temperature sensor (exhaust gas temperature detection device) 38 that detects an exhaust gas temperature are input to the DCU 36. The DCU 36 is connected, via a network such as a CAN (Controller Area Network), to the TCU 34 and an engine control unit (hereafter referred to as "ECU") 40 that executes various control of the engine 10, so as to be mutually communicable. The DCU 36 can thus read information such as information about an engine operating state including an engine speed and an engine load, about whether or not a gear change request (shift operation) is made by the driver, and about the control of the clutch mechanism 30 and the transmission 32 by the TCU 34, according to need. As the engine load, any of various known state quantities such as a fuel injection amount, an engine torque, an amount of accelerator operation by the driver, a manifold vacuum pressure, an intake air flow, and the like may be used.

By executing a control program stored in an internal ROM (Read Only Memory) or the like, the DCU 36 controls the urea water dosing device 26 according to the input signals and information to supply an appropriate amount of urea aqueous solution from the urea water tank 24 to the injection nozzle 18, so that the supplied urea aqueous solution is injection-supplied from the injection nozzle 18 to an exhaust upstream side of the NOx reduction catalytic converter 20. Note that a "control device" in the present invention is achieved by the DCU 36 executing the control program.

In the exhaust emission purifying apparatus according to this embodiment, the urea aqueous solution injection-supplied from the injection nozzle 18 to the exhaust upstream side of the NOx reduction catalytic converter 20 is hydrolyzed by exhaust heat and a water vapor in the exhaust gas to be converted to ammonia, and this ammonia generated as a result of hydrolysis is subjected to a reduction reaction with NOx in the exhaust gas in the NOx reduction catalytic converter 20. As a result, NOx in the exhaust gas is decomposed into water ($H_2O$) and nitrogen ($N_2$) and emitted (purified).

Here, in order to enhance a NOx purification rate by the NOx reduction catalytic converter 20, NO is oxidized to $NO_2$ in the nitrogen oxidation catalytic converter 16 and so a ratio of NO and $NO_2$ in the exhaust gas is improved to a ratio suitable for a catalytic reduction reaction. Moreover, ammonia having passed through the NOx reduction catalytic converter 20 is oxidized by the ammonia oxidation catalytic converter 22 disposed on an exhaust downstream side of the NOx reduction catalytic converter 20, thereby suppressing ammonia from being emitted directly.

Figure 2:
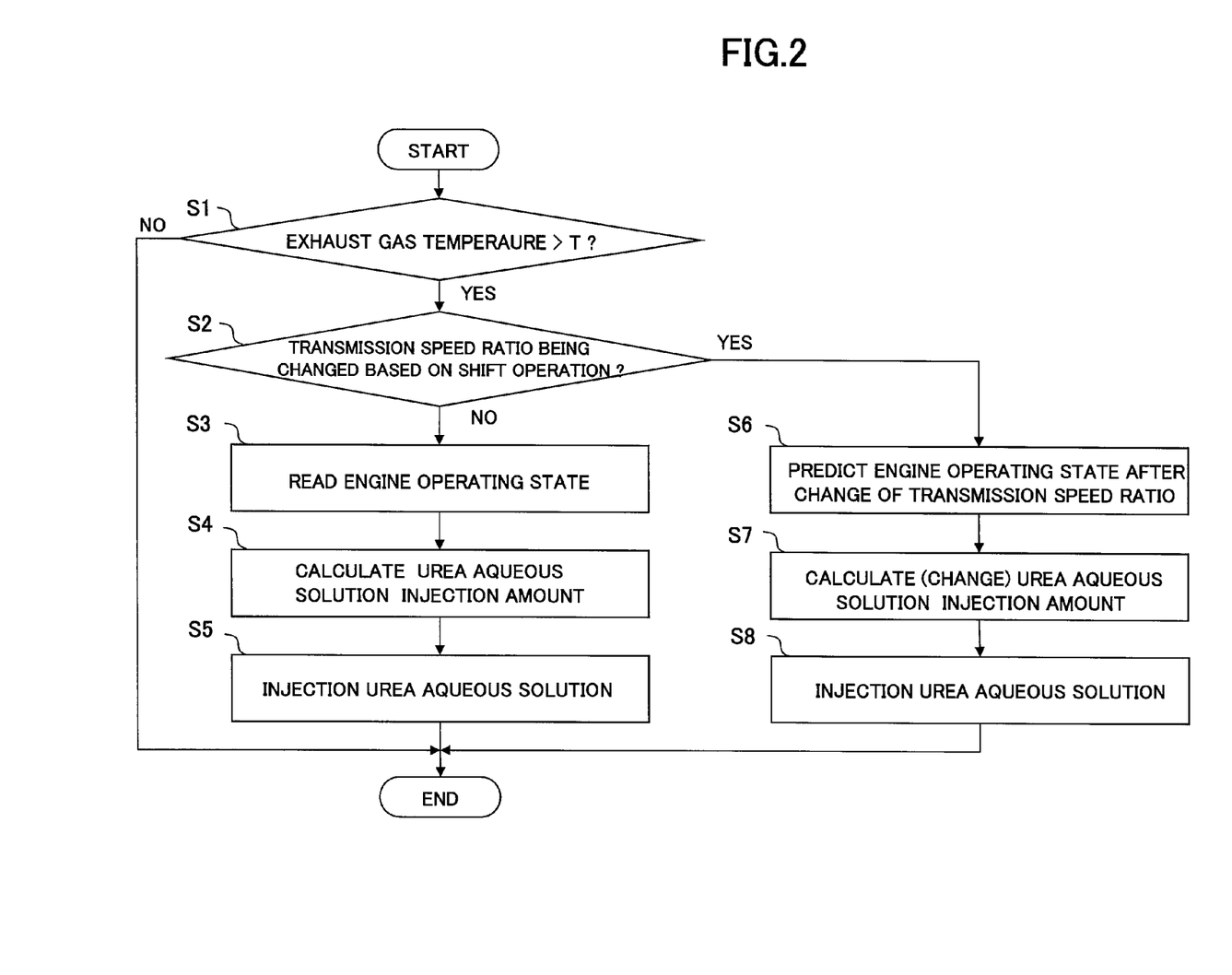
FIG. 2 is a flowchart of a control program executed by a urea water dosing control unit (DCU)

FIG. 2 is a flowchart of the control program executed by the DCU 36. This control program is started upon engine starting, and repeatedly executed at predetermined time intervals.

In step S1, it is determined whether or not the exhaust gas temperature detected by the temperature sensor 38 is higher than a predetermined temperature T. The predetermined temperature T is a threshold for determining whether or not the NOx reduction catalytic converter 20 is activated. For example, the predetermined temperature T is set to a temperature slightly higher than an activation temperature of a catalyst component. When the detected exhaust gas temperature is higher than the predetermined temperature T, the process proceeds to step S2. When the detected exhaust gas temperature is not higher than the predetermined temperature T, the process ends. In this way, the urea aqueous solution is kept from being injection-supplied in a state in which the NOx reduction catalytic converter 20 is not activated, thereby suppressing emission of the urea aqueous solution or ammonia into the air.

In step S2, it is determined whether or not a change of the transmission speed ratio based on the driver's shift operation is being performed. This determination is made based on information received from the TCU 34. For example, when the TCU 34 releases the clutch mechanism 30 according to the driver's shift operation, the TCU 34 outputs information indicating thereof to the DCU 36, and the DCU 36 determines that a change of the transmission speed ratio based on the driver's shift operation is being performed. In the case in which no change of the speed ratio of the transmission 32 based on the driver's shift operation is being performed ("NO"), the process proceeds to step S3.

In step S3, the engine speed and the engine load (engine torque) are read from the ECU 40 as the engine operating state.

Figure 3:
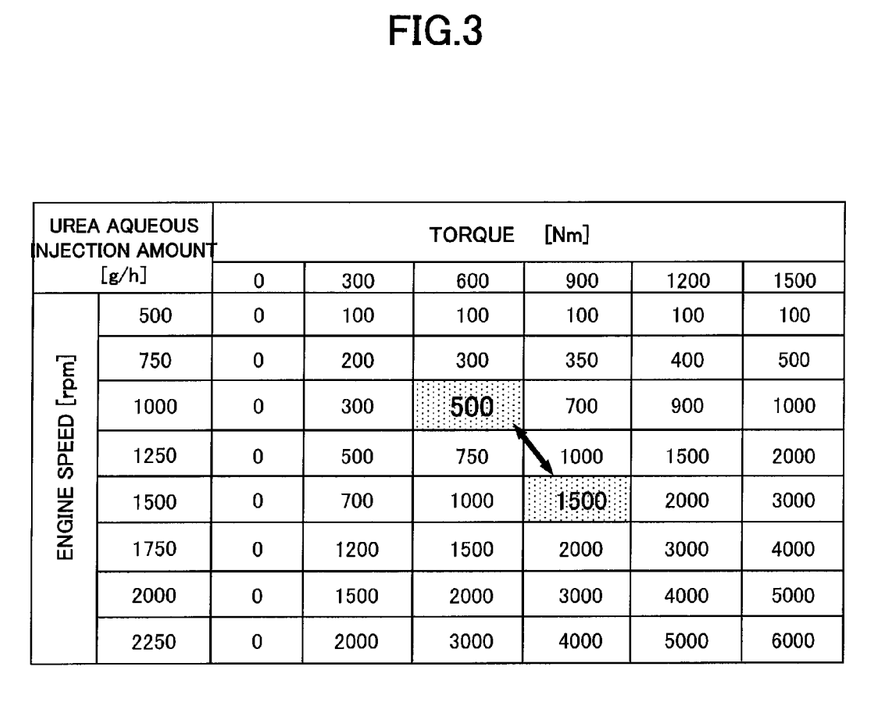
FIG. 3 is a view illustrating an example of a urea aqueous solution injection amount map.

In step S4, with reference to a urea aqueous solution injection map (see FIG. 3) in which urea aqueous solution injection amounts corresponding to engine speeds and engine torques are set, a urea aqueous solution injection amount suitable for the engine speed and the engine torque read in step S3 is set. Thus, a urea aqueous solution injection amount corresponding to an NOx emission amount from the engine 10 is set. Note that each urea aqueous solution injection amount in the urea aqueous solution injection map illustrated in FIG. 3 is merely an example.

In step S5, a control signal according to the urea aqueous solution injection amount set in step S4 is output to the urea water dosing device 26, to injection-supply the urea aqueous solution to the exhaust upstream side of the NOx reduction catalytic converter 20. In this way, during normal running in which the change of the transmission speed ratio based on the driver's shift operation is not being performed, the amount of urea aqueous solution set based on the actual engine operating state is injection-supplied to the exhaust upstream side of the NOx reduction catalytic converter 20.

Figure 4:
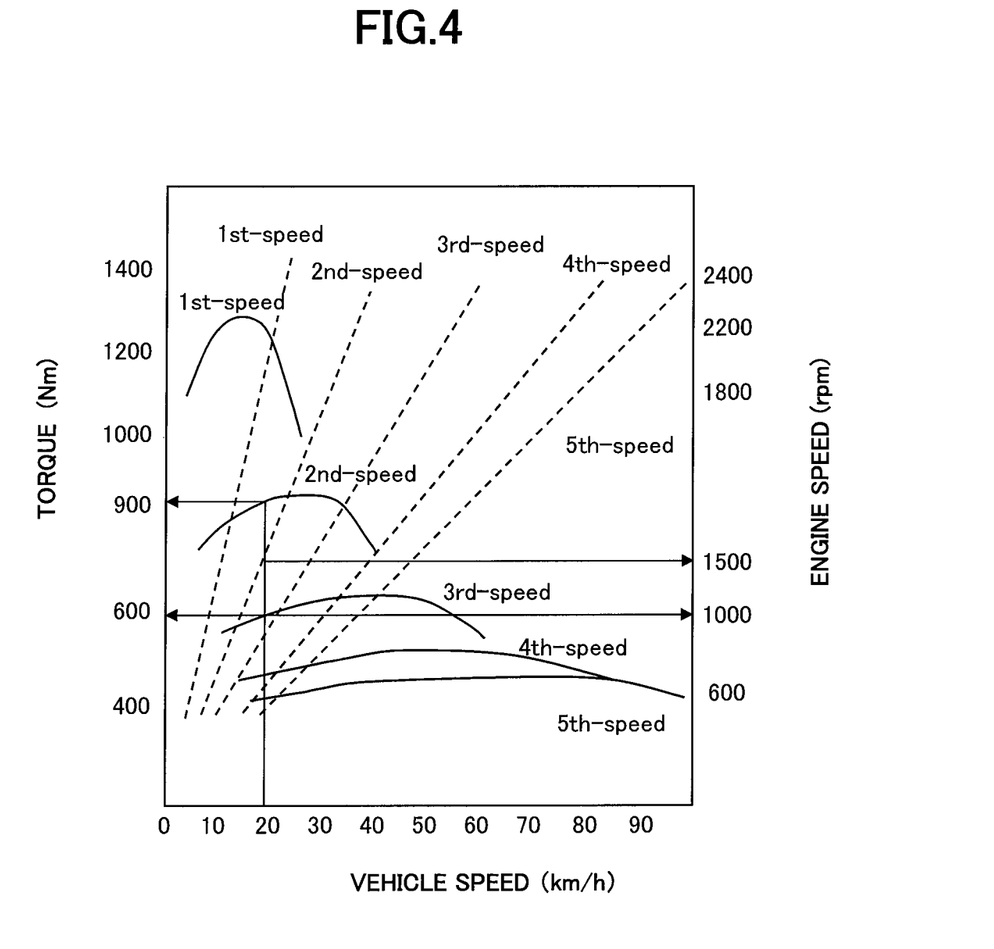
FIG. 4 is a view illustrating an example of running performance curves used when predicting an engine operating state after a change of a transmission speed ratio.

On the other hand, in the case in which the change of the speed ratio of the transmission 32 based on the driver's shift operation is being performed in step S2 ("YES"), the process proceeds to step S6, in which the engine operating state after the change of the transmission speed ratio based on the driver's shift operation is predicted. Since the urea aqueous solution injection map (FIG. 3) is used here, an engine speed and an engine torque after the change of the transmission speed ratio are predicted based on running performance curves as illustrated in FIG. 4. For example, when the driver performs a downshift operation from third-speed to second-speed while the vehicle is running at 20 (km/h), it is predicted that the engine operating state [engine speed, engine torque] changes from the current state [third-speed: 1000 (rpm), 600 (N·m)] to a state [second-speed: 1500 (rpm), 900 (N·m)]. Conversely, when the driver performs an upshift operation from second-speed to third-speed while the vehicle is running at 20 (km/h), it is predicted that the engine operating state [engine speed, engine torque] changes from the current state [second-speed: 1500 (rpm), 900 (N·m)] to a state [third-speed: 1000 (rpm), 600 (N·m)]. Note that this is merely an example, and the engine operating state after the change of the transmission speed ratio may be predicted by other methods.

In step S7, with reference to the urea aqueous solution injection map (FIG. 3), a urea aqueous solution injection amount suitable for the engine speed and the engine torque predicted in step S6 is set. Thus, the urea aqueous solution injection amount is changed.

In this embodiment, as is clear from the urea aqueous solution injection map (FIG. 3), the urea aqueous solution injection amount is increased when the driver performs a downshift operation from third-speed to second-speed while the vehicle is running at 20 (km/h), whereas the urea aqueous solution injection amount is decreased when the driver performs an upshift operation from second-speed to third-speed while the vehicle is running at 20 (km/h).

In step S8, a control signal according to the urea aqueous solution injection amount set in step S7 is output to the urea water dosing device 26, to injection-supply the urea aqueous solution to the exhaust upstream side of the NOx reduction catalytic converter 20. In this way, at the gear change by the driver's shift operation, the amount of urea aqueous solution set based on the predicted engine operating state after the gear change, that is, the amount of urea aqueous solution corresponding to the NOx emission amount of the engine 10 after the gear change, is injection-supplied to the exhaust upstream side of the NOx reduction catalytic converter 20.

Figure 5A:
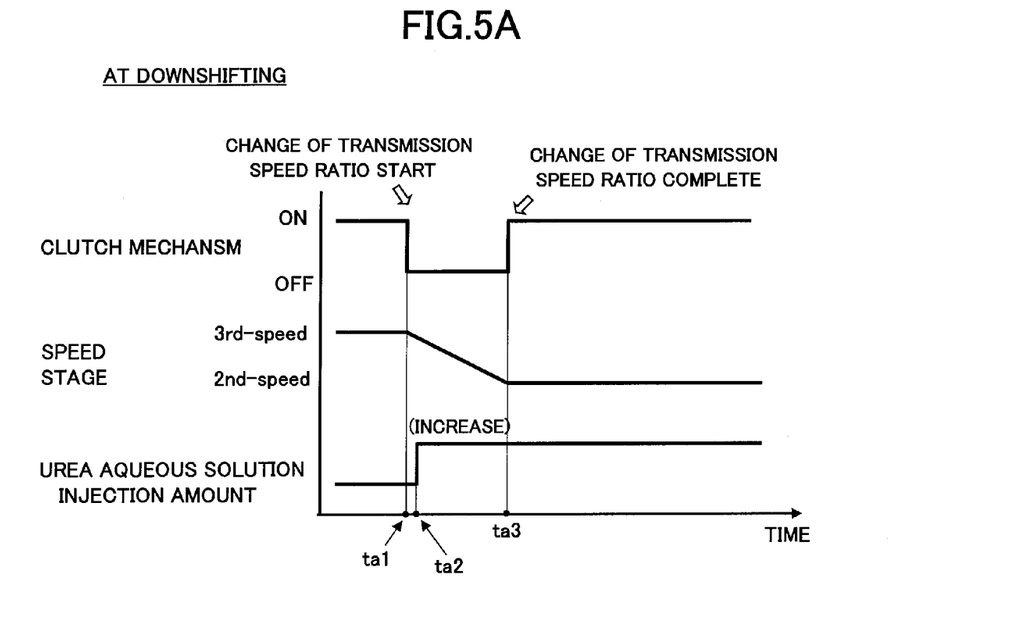
FIG. 5 is a time chart of control executed by the urea water dosing control unit (DCU).
Figure 5B:
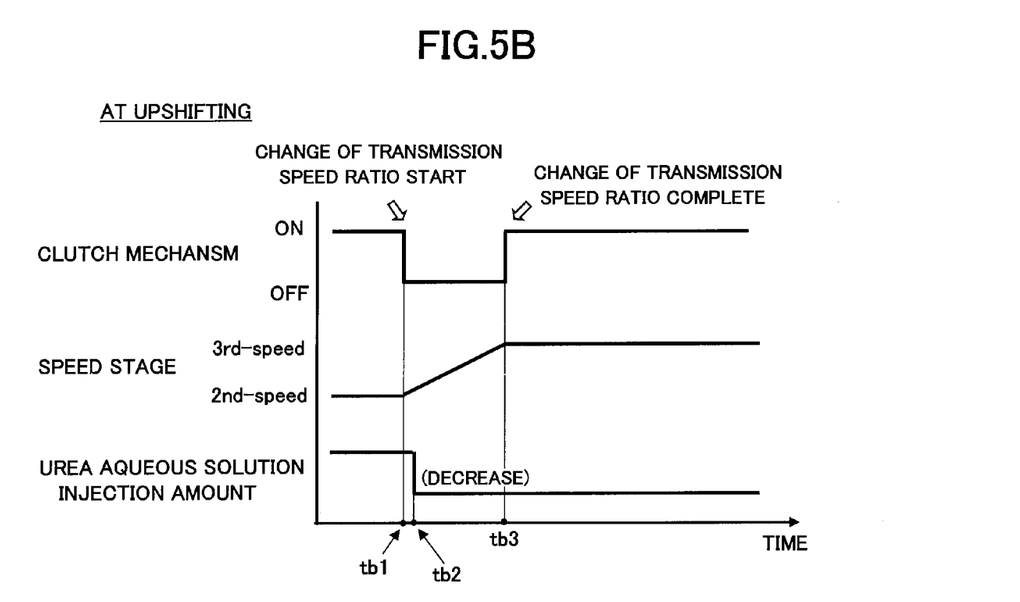

FIG. 5 is a time chart of the above-mentioned control executed by the DCU 36. FIG. 5A is a time chart at downshifting, and FIG. 5B is a time chart at upshifting.

As illustrated in FIG. 5A, for example when the driver performs a downshift operation while running at 20 (km/h) in third-speed, in order to change the transmission speed ratio from that of third-speed to that of second-speed, the TCU 34 first releases the clutch mechanism 30 (clutch OFF), and then starts the change operation of the speed ratio of the transmission 32 (ta1). Though the urea aqueous solution injection amount is normally set according to the actual engine operating state, at a change of the transmission speed ratio based on the driver's shift operation, the urea aqueous solution injection amount is set based on the predicted engine operating state after the change of the transmission speed ratio. Accordingly, the urea aqueous solution injection amount is increased during the change of the transmission speed ratio from that of third-speed to that of second-speed by the TCU 34, and the increased urea aqueous solution is injection-supplied (ta2). When the change operation of the speed ratio of the transmission 32 ends, the TCU 34 engages the clutch mechanism 30 (clutch ON) to complete the change of the transmission ratio (ta3).

On the other hand, as illustrated in FIG. 5B, for example when the driver performs an upshift operation while running at 20 (km/h) in second-speed, in order to change the transmission speed ratio from that of second-speed to that of third-speed, the TCU 34 first releases the clutch mechanism 30 (dutch OFF), and then starts the change operation of the speed ratio of the transmission 32 (tb1). The urea aqueous solution injection amount is decreased during the change of the transmission speed ratio from that of second-speed to that of third-speed by the TCU 34, and the decreased urea aqueous solution is injection-supplied (tb2). When the change operation of the speed ratio of the transmission 32 ends, the TCU 34 engages the clutch mechanism 30 (clutch ON) to complete the change of the transmission speed ratio (tb3).

Note that FIGS. 5A and 5B each merely illustrate an example of a time of increasing or decreasing the urea aqueous solution injection amount at a change of the transmission speed ratio. The urea aqueous solution injection amount may be increased or changed during a change of the transmission speed ratio (i.e., during a gear change).

As described above, at a change of the transmission speed ratio based on the driver's shift operation, the exhaust emission purifying apparatus according to this embodiment sets the urea aqueous solution injection amount based on the engine operating state after the change of the transmission speed ratio (after the gear change), and starts the injection-supply before the change of the transmission speed ratio (before the gear change) is completed.

Thus, in the case in which, for example at downshifting, the engine operating state is predicted to change in a direction in which the NOx emission amount from the engine 10 increases, the urea aqueous solution is increased in amount and injected in advance before the engine operating state changes, thereby enabling a sufficient amount of ammonia to be adsorbed to the NOx reduction catalytic converter 20. Therefore, even in the case in which the NOx emission amount increases suddenly, a high NOx purification rate can be maintained. In particular, at downshifting, there is an instance in which further acceleration is performed after a change of the transmission speed ratio, causing an increase in NOx emission amount from the engine 10. Even in such a case, a decrease in NOx purification rate can be prevented because more ammonia is adsorbed to the NOx reduction catalytic converter 20 in advance.

In the case in which, for example at upshifting, the engine operating state is predicted to change in a direction in which the NOx emission amount from the engine 10 decreases, the urea aqueous solution is decreased in amount and injected in advance before the engine operating state changes. This prevents the injected urea aqueous solution from being emitted without contributing to NOx reduction, so that the urea aqueous solution can be effectively used.

In the embodiment described above, the transmission 32 that operates in the automatic transmission mode and the manual transmission mode is used, and the DCU 36 determines, based on information received from the TCU 34, whether or not a change of the transmission speed ratio based on the driver's shift operation is being performed. However, the present invention is not limited to this, and is also applicable to the case in which a manual transmission is connected to the engine 10. In this case, for example, a clutch sensor that outputs a signal corresponding to an operating state of a clutch pedal and a shift position sensor that detects a position of a shift lever of an automatic transmission may be provided so that whether or not a change of the transmission speed ratio based on the driver's shift operation is being performed, a current speed stage, a speed stage after the change of the transmission speed ratio, and the like are determined based on output signals of these sensors.

At a change of the transmission speed ratio based on the driver's shift operation, the urea aqueous solution injection amount is set based on the engine operating state after the change of the transmission speed ratio and the injection-supply is carried out. However, for example when the driver performs a downshift operation, the urea aqueous solution injection amount may be temporarily increased or changed by a predetermined amount set in advance, without or before predicting the engine operating state after the change of the transmission speed ratio. Moreover, for example when the driver performs an upshift operation, the injection-supply of the urea aqueous solution may be temporarily decreased or changed in amount or stopped, without or before predicting the engine operating state after the change of the transmission speed ratio. This can simplify control, though with lower precision.

The urea aqueous solution which is a precursor of ammonia as a reducing agent is injection-supplied to the exhaust upstream side of the NOx reduction catalytic converter 20, but the present invention is not limited to this, and may use, for example, an ammonia aqueous solution. Moreover, alcohol, light oil, and the like having hydrocarbon as a main component may be used according to a NOx reducing mechanism in the NOx reduction catalytic converter 20.

It should be appreciated that the entire contents of Japanese Patent Application No. 2008-323148, filed on Dec. 19, 2008, on which the convention priority is claimed is incorporated herein by reference.

It should also be understood that many modifications and variations of the described embodiments of the invention will occur to a person having an ordinary skill in the art without departing from the spirit and scope of the present invention as claimed in the appended claims.

What is claimed is:

1. An exhaust emission purifying apparatus for an engine, comprising:
    a reduction catalytic converter that is disposed in an exhaust pipe of the engine connected to a transmission, and reduces and purifies nitrogen oxides in exhaust gas using a reducing agent;
    an injection-supply device that injection-supplies a urea aqueous solution, which generates the reducing agent, to an exhaust upstream side of the reduction catalytic converter; and
    a control device that, at shift change operation of the transmission based on a driver's operation, sets an injection-supply amount of the urea aqueous solution by the injection-supply device, based on an engine operating state which is predicted after a change of a transmission speed ratio, and that changes the injection-supply amount of the urea aqueous solution by the injection-supply device during the change of the transmission speed ratio.

2. The exhaust emission purifying apparatus for the engine according to claim 1, wherein the control device increases the injection-supply amount of the urea aqueous solution by the injection-supply device, at downshifting, and decreases the injection-supply amount of the urea aqueous solution by the injection-supply device, at upshifting.

3. The exhaust emission purifying apparatus according to claim 1, wherein the control device has a control map in which an injection-supply amount of the urea aqueous solution corresponding to an engine operating state is recorded, and
    wherein, at the shift change operation of the transmission based on the driver's operation, the control device predicts the engine operating state after the change of the transmission speed ratio referring to the control map, sets the injection-supply amount of the urea aqueous solution corresponding to the predicted engine operating state, and controls the injection-supply device based on the set injection-supply amount.

\* \* \* \* \*